Sept. 5, 1939.  A. B. HÄRJE  2,171,694
CUTTING TOOL
Filed April 20, 1937

INVENTOR

August Bengtsson Härje

Patented Sept. 5, 1939

2,171,694

UNITED STATES PATENT OFFICE 2,171,694

CUTTING TOOL

August Bengtsson Härje, Copenhagen, Denmark

Application April 20, 1937, Serial No. 137,925
In Denmark April 21, 1936

2 Claims. (Cl. 29—96)

The present invention relates to improvements in cutting tools. In lathes and similar machines in which there are employed cutting tools, such tools have to be adjusted to a certain height and in a certain position in relation to the work piece. Hitherto such adjustment has been obtained by interposing spacing members between the cutting tool and the slide by which it is operated. When the cutting tool is to be exchanged for another tool, or when a readjustment is required, the clamping means are loosened and the tool and spacing members removed separately, and upon a renewed attachment of the cutting tool, its adjustment has to take place from anew.

The object of the present invention is to provide means for obviating the necessity of such renewed adjustment of the cutting tool after its first adjustment, and according to the invention this is obtained by providing the cutting member with a suitable holder and appertaining spacing members, which holder and spacing members are fixed to the cutting member, and upon the removal of the latter from the lathe the cutting member, holder and spacing members are removed as a unit and remain in this condition until again required.

The invention is illustrated in the accompanying drawing in which

Figure 1:
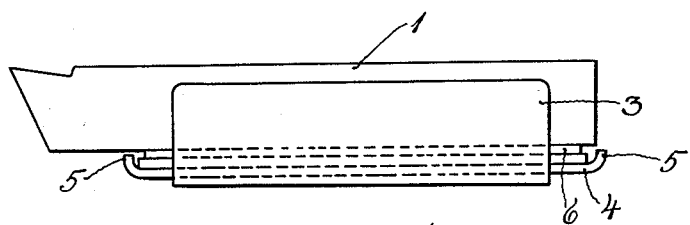
Figure 2:
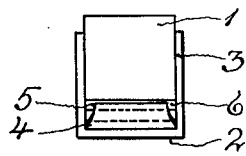

Fig. 1 shows a cutting tool with holder according to the invention,

Fig. 2 an end elevation of same, and

Figure 3:
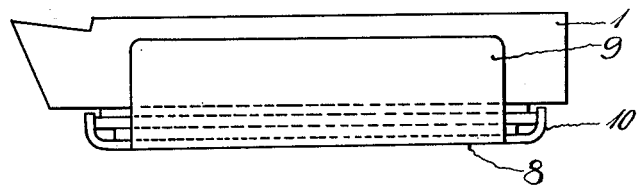

Fig. 3 a modified manner of construction of the holder in side elevation and with cutting tool inserted therein.

Referring to the drawing 1 indicates the cutting tool that is inserted within a holder of sheet metal bent to U-form section and comprising a base 2 and two sides 3. The spacing of the walls is so as to allow a resilient grip of the holder on the cutting member 1 when the latter is inserted therein.

Beneath the cutting member 1 and disposed upon the base 2 of the holder there is a spring member 4 with projecting ends 5 that are somewhat upwardly bent. Above this spring member 4 and beneath the cutting member 1 there are interposed a number of spacing members 6 consisting of strips of sheet metal, and by means of which the height of the cutting member 1 may be adjusted in relation to the work piece. The spacing members have such a length that may be disposed between the upwardly bent ends 5 of the spring member 4, which thus serve to hold the spacing members in position longitudinally and prevent their falling out of the holder when loosened.

For facilitating the removal of the holder 2, 3 from the cutting tool 1, and for avoiding the employment of any tool for this purpose, the outer surfaces of the sides 3 may be serrated in any appropriate manner.

In order to provide the holder with sufficient resiliency it is necessary to employ a comparatively hard metal in its construction, but such hard metal provides poor friction. To remedy this drawback, it is proposed to provide the surfaces of the holder and if necessary likewise the surfaces of the spring member and the spacing members with a coating of a softer metal. This may be brought about by for instance coating the said members with a layer of zinc or copper or any other appropriate soft metal. As an alternative it is proposed that the said surfaces are treated with a suitable reducing substance for producing a soft outer surface. By such provisions as mentioned there is obtained an increased power of friction between abutting surfaces, which is of importance in connection with machines for precise work, and in which an extreme tightening of the cutting tool would prevent the easy movement of the slide carrying the cutting tool.

A modification of the holder is illustrated in Fig. 3, where the base 8 of a holder connects the walls 9 thereof and extends from either end thereof to form spring members 10, which are bent slightly upwards so as to engage the ends of spacing members that may be placed within the holder in the manner described previously.

I declare that what I claim is:

1. In a cutting tool unit for use in lathes and similar machines, the combination of a cutting tool, a longitudinal holder base, resilient walls formed along the sides of the holder base to engage resiliently the sides of the cutting tool, removable spacing members interposed between the base and the lower side of the cutting tool, and means for holding the spacing members in position in relation to each other longitudinally.

2. In a cutting tool unit for use in lathes and similar machines, the combination of a cutting tool, a longitudinal holder base, resilient walls formed along the sides of the holder base to engage resiliently the sides of the cutting tool, removable spacing members interposed between the base and the lower side of the cutting tool, and upwardly bent extensions on each end of the base within which the said spacing members are disposed.

AUGUST BENGTSSON HÄRJE.